US009459928B2

(12) United States Patent
Bonola et al.

(10) Patent No.: US 9,459,928 B2
(45) Date of Patent: Oct. 4, 2016

(54) REMOTE GRAPHICS CONSOLE AND VIRTUAL MEDIA ACCESS TO VIRTUAL MACHINE GUESTS

(75) Inventors: Thomas J. Bonola, Cypress, TX (US); John M. Hemphill, Spring, TX (US); Mike Dickson, Magnolia, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1137 days.

(21) Appl. No.: 13/060,199

(22) PCT Filed: Aug. 22, 2008

(86) PCT No.: PCT/US2008/074049
§ 371 (c)(1),
(2), (4) Date: Feb. 22, 2011

(87) PCT Pub. No.: WO2010/021631
PCT Pub. Date: Feb. 25, 2010

(65) Prior Publication Data
US 2011/0161482 A1   Jun. 30, 2011

(51) Int. Cl.
*G06F 9/50* (2006.01)
*G06F 15/16* (2006.01)

(52) U.S. Cl.
CPC .................................. *G06F 9/5077* (2013.01)

(58) Field of Classification Search
CPC .................................................... G06F 9/5077

USPC ........................................................ 709/223
See application file for complete search history.

(56) References Cited

U.S. PATENT DOCUMENTS

| | | | |
|---|---|---|---|
| 2005/0120160 A1* | 6/2005 | Plouffe et al. | 711/1 |
| 2006/0010433 A1 | 1/2006 | Neil | |
| 2008/0005222 A1* | 1/2008 | Lambert et al. | 709/203 |
| 2008/0005748 A1 | 1/2008 | Mathew et al. | |
| 2011/0061045 A1* | 3/2011 | Phillips | 717/173 |

FOREIGN PATENT DOCUMENTS

WO   WO/ 2007/109484   9/2007

OTHER PUBLICATIONS

International Search Report and Written Opinion, dated May 20, 2009, 11 pages.

* cited by examiner

*Primary Examiner* — Suraj Joshi
(74) *Attorney, Agent, or Firm* — Koestner Bertani LLP

(57) ABSTRACT

A data processing system supports remote graphics console and virtual media access to virtual machines. The data processing system is configured for usage with a virtualization platform that runs multiple operating systems simultaneously on at least one physical server. The data processing system comprises a virtual keyboard/video/mouse (KVM) element integrated into the virtualization platform and is configured to generate a remote management graphics console and map virtual media into the operating system plurality.

23 Claims, 4 Drawing Sheets

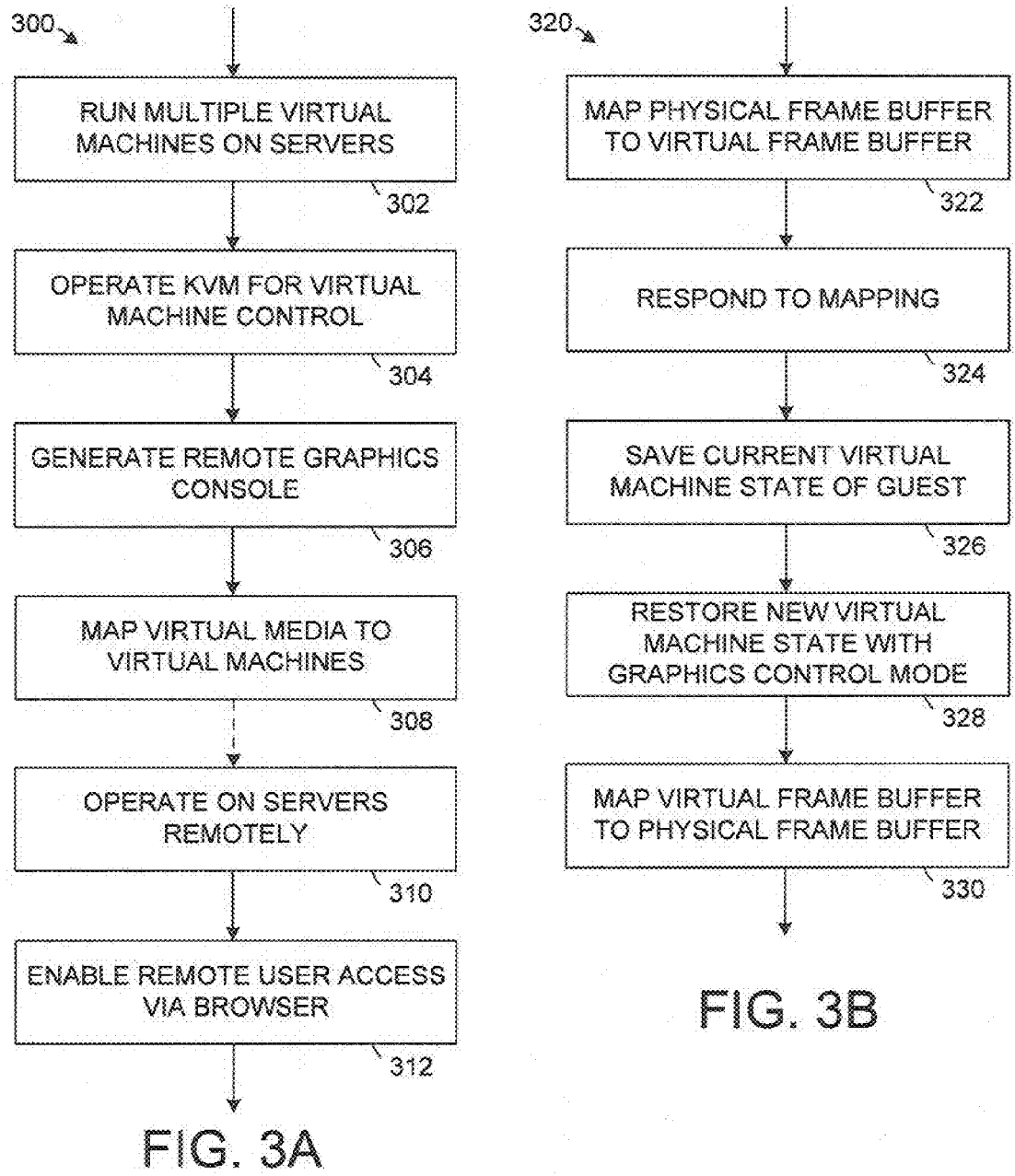

REMOTE GRAPHICS CONSOLE AND VIRTUAL MEDIA ACCESS TO VIRTUAL MACHINE GUESTS

CROSS-REFERENCE TO RELATED APPLICATION

This application is a national stage application under 35 U.S.C. §371 of PCT/US2008/074049, filed 22 Aug. 2008.

BACKGROUND

Virtual machine technology is used to create and concurrently run one or more guest operating systems on a physical device. One or more virtual machines can operate on a single host computing system, each including an operating system with concurrent applications.

Increases in data center density and complexity lead to increased demand for information technology efficiency and responsiveness. Thus, various operational aspects of virtualization increase in importance.

SUMMARY

Embodiments of a data processing system support remote graphics console and virtual media access to virtual machines. The data processing system is configured for usage with a virtualization platform that runs multiple operating systems simultaneously on at least one physical server. The data processing system comprises a virtual keyboard/video/mouse (KVM) element integrated into the virtualization platform and is configured to generate a remote management graphics console and map virtual media into the operating system plurality.

BRIEF DESCRIPTION OF THE DRAWINGS

Embodiments of the invention relating to both structure and method of operation may best be understood by referring to the following description and accompanying drawings:

FIGS. 3A through 3D are flow charts illustrating one or more embodiments or aspects of a computer-executed method for operating a virtualizing network computing system that supports remote graphics console and virtual media access to virtual machines.

DETAILED DESCRIPTION

Various embodiments of a virtualization system and associated techniques enable baseboard management controller remote graphics console and virtual media access to virtual machine guests.

For example, a virtualization system, associated software, and operational techniques enable users to fully utilize a baseboard management controller remote graphics console to access guest virtual machines and to map baseboard management controller virtual media into guests running on the server. In a particular implementation, baseboard management controller remote graphics console operations and baseboard management controller virtual media mapping into each guest can be attained by implementing a virtual KVM (keyboard/video/mouse) function in a virtualization platform.

Accordingly, physical servers running virtualization software are enabled remote access to guest consoles through a baseboard management controller, without relying on remote management tools for the virtualization platform and installation of software on a separate machine for accessing guest virtual machines running on a virtualized server.

Embodiments of the illustrative system and associated method comprise a virtualization platform that implements a virtual KVM (keyboard/video/mouse) function to the local human interface devices connected to the physical server, enabling a baseboard management controller to also remotely access virtual guest consoles through a browser. Additionally, the virtualization platform can scan baseboard management controller Universal Serial Bus (USB) ports and surface USB media directly into the guests, and can map ISO images (International Organization for Standardization (ISO) 9660 file system images) remotely as virtual USB CD/DVD-ROM devices.

Figure 1:
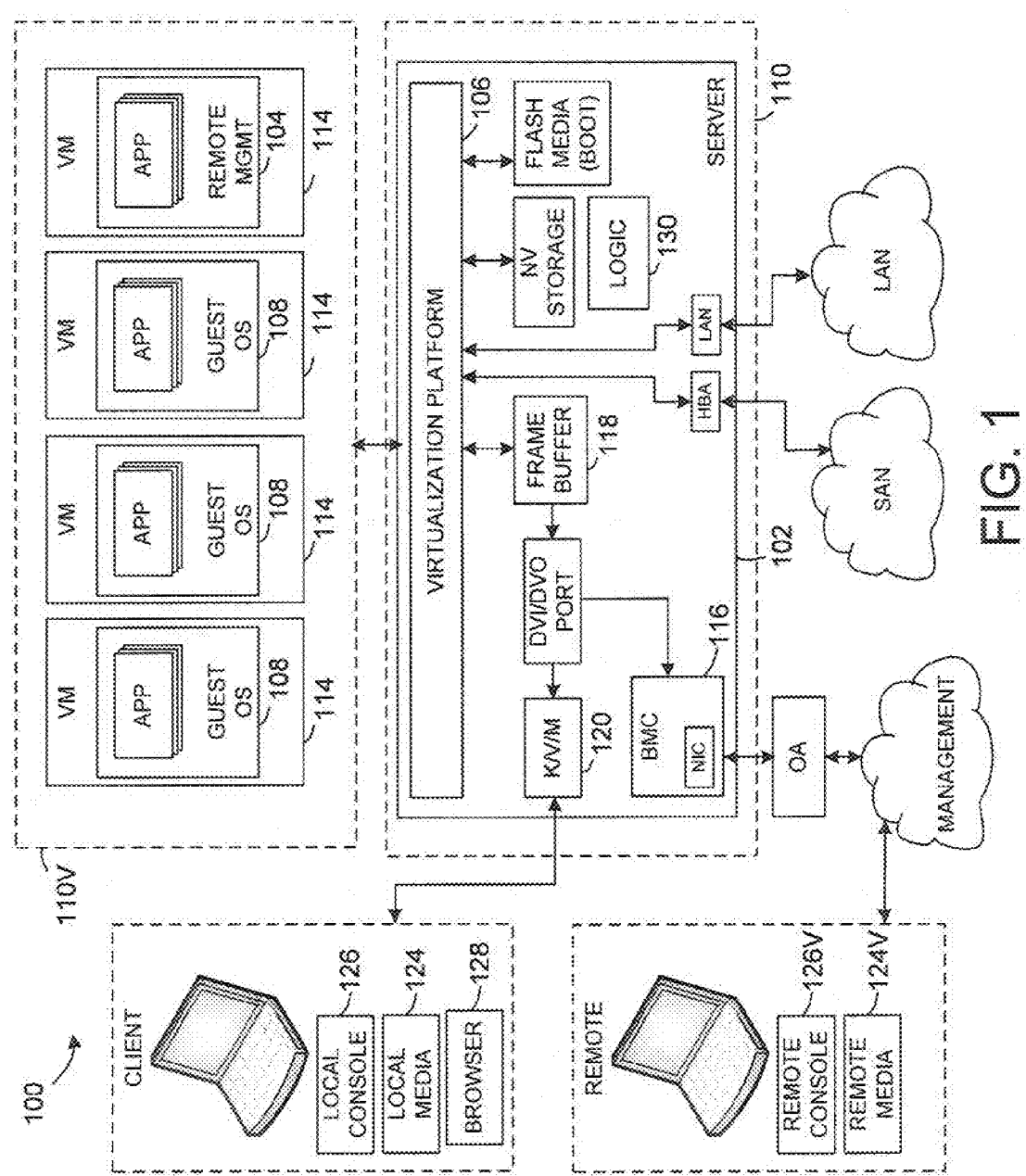
FIG. 1 is a schematic block diagram illustrating an embodiment of a data processing system that supports remote graphics console and virtual media access to virtual machines.

Referring to FIG. 1, a schematic block diagram illustrates an embodiment of a data processing system 100 that supports remote graphics console and virtual media access to virtual machines 114. The data processing system 100 is configured for usage with a virtualization platform 106 that runs multiple operating systems 108 simultaneously on one or more physical servers 102. The data processing system 100 comprises a virtual keyboard/video/mouse (KVM) element 120 that executes in the virtualization platform 106 to generate a remote management graphics console 126 and map virtual media 124 into the operating systems 108. In an illustrative implementation, the virtual KVM (vKVM) can be implemented in the virtualization platform 106, for example a hypervisor, and, through hot-key access, can determine which guest console within the virtual machine 114 is displayed on a local physical frame buffer 118 and presented to the local console 126, if connected. In concurrent operation, a baseboard management controller 116 monitors local frame buffer graphics activity and reflects the activity over a baseboard management controller Network Interface Controller (NIC) to the remote client computer.

Virtual media 124 is a functionality of the baseboard management controller 116 that maps the client computer's physical devices over the baseboard management controller NIC and presents the devices as local physical media to the physical server 102. The baseboard management controller 116 presents the remote client's media as local server media, which can be called local server virtual media. An example implementation of the virtualization platform 106 recognizes and maps the local server virtual media directly into one or more guests, simultaneously for read-only devices and sequentially for read-write devices.

In an example embodiment, the KVM element 120 can be implemented as a virtual KVM that executes, typically as software, in the virtualization platform 106 and manages focus between guests 108 and the local console 126. Virtual KVM can have hot-key activation [SHIFT-key] with [SHIFT] [Fn] for selecting a virtual machine guest where 'n' represents the target guest. The guest-in-focus has access to physical server devices including keyboard, video, mouse, CD/DVD-ROM, USB, serial, floppy virtual media through baseboard management controller (virtual USB devices), and others. The guest virtual frame buffer can be presented to a physical VGA frame buffer 118 for saving and restoring the graphics adapter state. The guest virtual frame buffer can be implemented by virtualization software in a virtual machine 114. The virtualization platform 106 can be used to implement the virtual KVM function the local console 126.

The virtualization platform 106 can be a hypervisor, a virtual machine monitor (VMM), or other suitable virtualization system.

The data processing system 100 can further comprise a physical server 102 and a baseboard management controller 116 integrated into the physical server 102 that controls the virtualization platform 106 and the operating systems 108 including both physical 110 and virtual 110V resources. The virtual keyboard/video/mouse (KVM) element 120 is communicatively-coupled for managing operations of the baseboard management controller 116. The KVM element 120 thus enables system or user awareness and a capability to administer the baseboard management controller 116.

The baseboard management controller 116 can be implemented to enable remote management. The baseboard management controller 116 enables remote console access to management and guest virtual machines, virtual KVM capabilities implemented using various functions such as [SHIFT][Fn], [SHIFT][ESC], virtual media (CD/DVD-ROM, USB) devices, hot-keys, management console tools (for example ProLiant Virtual Console (PVC), and the like.

An example implementation of the baseboard management controller 110 can be an embedded server management technology system such as integrated Lights-Out (iLO) from Hewlett-Packard Company of Palo Alto, Calif.

The baseboard management controller 116 can be further configured to monitor a Digital Video In/Digital Video Out (DVI/DVO) graphics port and send data from a local physical frame buffer 118 to a remote console viewed from a browser 128. In an example implementation, a baseboard management controller 110 such as iLO monitors the DVI/DVO graphics port and presents the data on the local physical frame buffer 118 to the remote console viewed from a browser 128 over an Ethernet connection. In the illustrative implementation, a dedicated Ethernet port located on the BMC and a standalone client, typically a notebook computer, connects through the Ethernet port to the BMC and can browse to any of the VM guest consoles.

In some implementations, the data processing system 100 can include logic 130 that scans input/output ports and media of the baseboard management controller directly into guests 108. For example, the logic 130 can control the virtualization platform 106 to scan baseboard management controller Universal Serial Bus (USB) ports and surface USB media directly into the guests 108.

The illustrative data processing system 100 enables access and control of virtual machine consoles on the physical server 102 without installation of remote management tools which are specific to the virtualization platform and bypass, thus rendering inoperable, the baseboard management controller remote graphics console. The depicted data processing system 100 thus enables the baseboard management controller remote graphics console for accessing and managing guest operating systems.

In some embodiments, the data processing system 100 can be implemented to include the virtualization platform 106 for running the operating systems 108 simultaneously on the physical servers 102.

Some embodiments of the data processing system 100 can comprise a physical server 102 that is communicatively coupled to the virtualization platform 106 and operates to run the operating systems 108.

The data processing system can further comprise a remote management device 104 and the virtual keyboard/video/mouse (KVM) element 120. The remote management device 104 is coupled to one or more physical servers 102 and performs operations on the physical servers 102 from a remote location. The KVM element 120 enables the remote management device 104 to remotely access a virtual guest console via a browser 128 in a client 112. The client 112 can communicate with the servers 102 through a network connection, for example via an Onboard Administrator (OA).

In an example implementation, the data processing system 100 can further comprise logic 130 that maps a physical server graphics frame buffer 118 directly into a virtual frame buffer of a selected guest 108. The virtualization platform 106 can be configured to respond to the mapping by saving a current virtual machine (VM) state associated with the selected guest 108, restoring a newly designated VM state including a graphics controller mode, and mapping the selected guest virtual frame buffer to the physical server graphics frame buffer 118.

The virtual KVM (vKVM) 120 of the virtualization platform 106 directs the guest console of a selected virtual machine 114 to the physical server frame buffer 118, which is reflected through the baseboard management controller Network Interface Controller (NIC) by the baseboard management controller 116 and presented to the client computer's physical frame buffer 118 through a browser running on the remote client computer.

The virtual KVM (vKVM) 120 can perform computer-executed control operations that enable exporting of a guest console to a local monitor 126, accepting local mouse and keyboard input signals, and performing operations on a physical server 102 from a remote location. Virtualization configuration information on auxiliary-power-only can be accessed when the physical server 102 is unbooted or powered-off. The vKVM 120 monitors a Digital Video In/Digital Video Out (DVI/DVO) graphics port and sends data from a local physical frame buffer 118 to a virtual frame buffer 118V at a remote console viewed from the browser 128.

The guest console can be exported to the local monitor 126 according to selection between two usage models in various conditions and circumstances. For example, the guest console can be exported to a local monitor 126 and guest consoles can be accessed via the local monitor 126 in absence of a connection between the physical server and the network. For network usage, the guest console can be exported to the local monitor 126 and the guest consoles accessed through the network via a baseboard management controller 116. The baseboard management controller 116 can be operated to monitor local server graphics activity to a local frame buffer 118 and transmit differences in the graphics activity to a target guest console.

In a system that implements an embedded server management technology system such as integrated Lights-Out (iLO), a user can select between the two usage models that operate with or without the iLO and network access. The first usage model operates with pure local console access to guest consoles without connecting the physical server 102 to a network. The second usage model operates with Remote Graphics Console access to guest consoles via an iLO Network Interface Controller (NIC), since iLO monitors local server graphics activity to a local frame buffer through the DVI output port and pumps the differences to the remote client over the iLO NIC, a technique which easily scales to enable Remote Graphics Console access to guest consoles through the Onboard Administrator (OA).

In a specific example implementation, the physical graphics frame buffer 118 can be mapped directly into a "focused" guest's virtual frame buffer. The focus function can be implemented through a hotkey selection (for example, <SHIFT><F1> to select VM1, <SHIFT><F2> to select VM2, and the like) at which point the virtualization platform 106 saves the currently focused virtual machine state, restores the newly selected virtual machine state including graphics controller mode, and maps the newly focused virtual machine's virtual frame buffer to the physical frame buffer 118.

For the remote management device 104 performing operations on the physical server(s) 102 from a remote location, logic 130 can be included that causes the virtualization platform 106 to respond to a user command by mapping local storage media 124 and remote management device virtual storage media 124V into the selected guest 108.

The virtual media 124V is physical media on the remote client computer that is presented by the baseboard management controller 116 as local server devices over the baseboard management controller Network Interface Controller (NIC). The baseboard management controller 116 presents the local server devices to the server 102 and the virtualization platform 106 on the server 102 responds by recognizing the devices into one or more virtual machines 114. For remote media in the form of a read-only device, the virtualization platform 106 can map the device directly into all virtual machines 114 simultaneously. For a read-write device, the virtualization platform 106 only maps the device into one virtual machine 114 to prevent write-access race conditions among multiple virtual machines 114 attempting to write to the device.

In a particular embodiment, iLO virtual media refers to the physical media on the remote client computer that is presented by iLO as local server devices over the iLO NIC. Once iLO presents the devices to the server, the hypervisor on the server recognizes and maps the devices directly into one or more VMs.

The logic 130 can map the local storage media 124 and the remote management device virtual storage media 124V concurrently into selected guests 108.

For example, other KVM menu options presented by the virtualization platform 106 include allowing the user to map local storage media (Universal Serial Bus (USB), Parallel AT Attachment-Compact Disk/Digital Versatile Disk (PATA-CD/DVD), floppy disk, and others) and baseboard management controller 116 virtual storage media (USB, CD-DVD, floppy) into the currently focused guest 108 by surfacing the newly added device(s) as an Advance Communication and Power Interface (ACPI) hot-add event. Such local and virtual baseboard management controller device mapping can be extended to permit simultaneous mapping to read-only devices (CD-DVD ROMs) allowing concurrent deployment of application software and operating systems 108 into different guests 108.

In some embodiments, the data processing system 100 can further comprise logic 130 that enables a user to control the virtualization platform 106 to perform virtual machine (VM) life cycle management including control of VM-shutdown, VM-suspend, and VM-startup operations directly from a local console 126.

For example, the virtualization platform's local console menu can also add features to control VM life-cycle management such as VM-shutdown, VM-suspend, VM-startup directly from the local console so that baseboard management controller 116 can support customers with the identical functionality and remote control capability.

Figure 2:
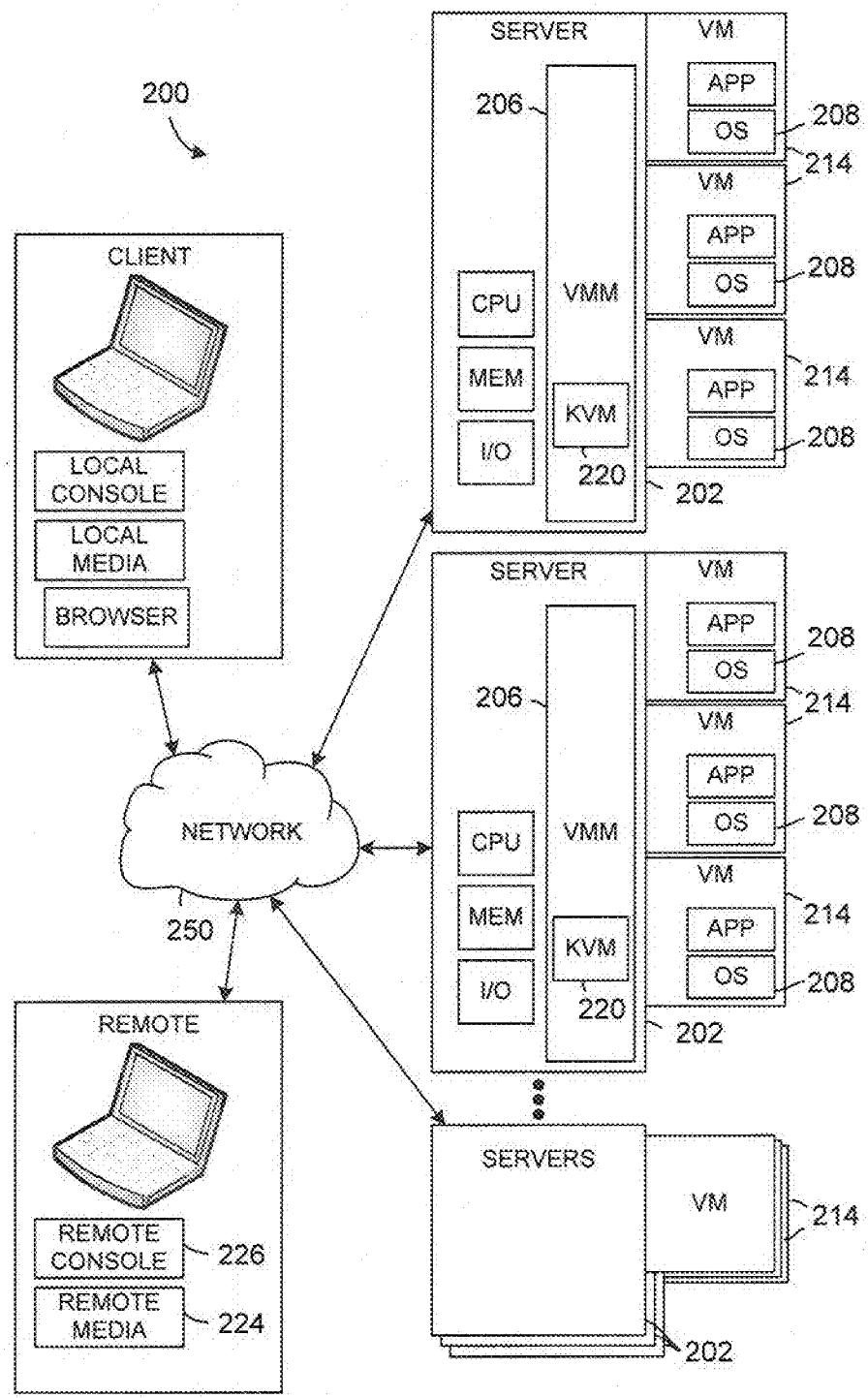
FIG. 2 is a schematic block diagram depicting an embodiment of a virtualizing network system that supports remote graphics console and virtual media access to virtual machines.

Referring to FIG. 2, a schematic block diagram depicts an embodiment of a virtualizing network system 200 that supports remote graphics console and virtual media access to virtual machines 214. The illustrative data processing system 200 comprises a network 250, multiple physical servers 202 communicatively coupled to the network 250 and a virtualization platform 206 which is configured to run multiple operating systems 208, and the multiple operating systems 208 simultaneously running on the physical server or servers 202. The virtualizing network system 200 comprises a virtual keyboard/video/mouse (KVM) element 220 integrated into the virtualization platform 206 and generates a remote management graphics console 226 and maps virtual media 224 into the operating systems 208.

Figure 3C:
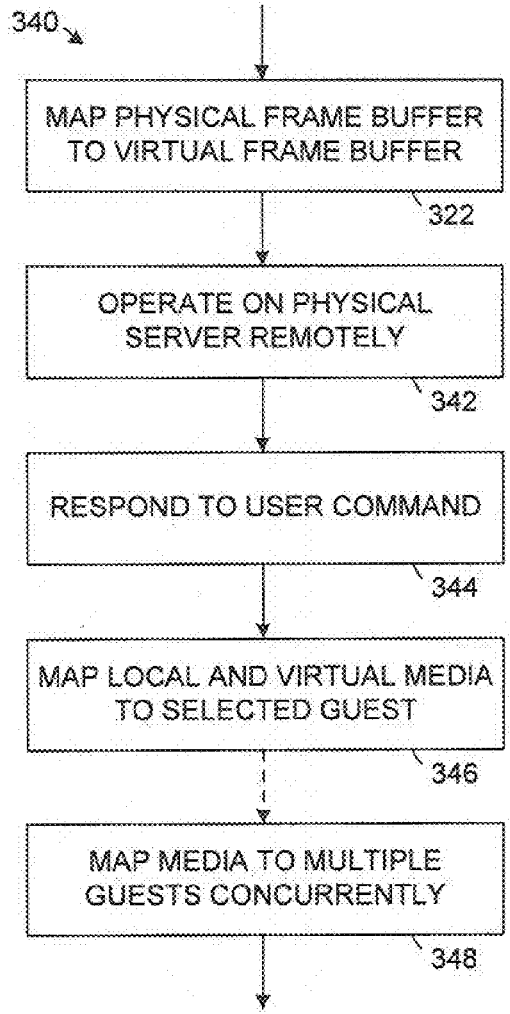

Referring to FIGS. 3A through 3D, flow charts illustrate one or more embodiments or aspects of a computer-executed method for operating a virtualizing network computing system that supports remote graphics console and virtual media access to virtual machines. FIG. 3A depicts a computer-executed method for operating 300 a virtualizing network computing system. The illustrative method 300 comprises running 302 multiple virtual machines (VMs) simultaneously on one or more physical servers and operating 304 a virtual keyboard/video/mouse (KVM) element for virtual machine control. The KVM is used to generate 306 a remote management graphics console and map 308 virtual media into the virtual machines.

In an example operation, operations can be performed 310 on the physical server or servers from a remote location, enabling a user to remotely access 312 a virtual guest console via a browser.

The KVM can be used to enable a user to control the virtualization platform to perform virtual machine (VM) life cycle management including VM-shutdown, VM-suspend, and VM-startup operations directly from a local console.

Referring to FIG. 3B, an embodiment of a method for operating 320 a virtualizing network computing system can comprise mapping 322 a physical server graphics frame buffer directly into a virtual frame buffer of a selected guest and responding 324 to the mapping. The response 324 can comprise saving 326 a current virtual machine state associated with the selected guest and restoring 328 a newly designated virtual machine state including a graphics controller mode. The selected guest virtual frame buffer is mapped 330 to the physical server graphics frame buffer.

Referring to FIG. 3C, for a system with the physical server graphics frame buffer mapped 322 directly into the virtual frame buffer of a guest, the method 340 can further comprise performing 342 operations on the one physical server from a remote location and responding 344 to a user command, for example by mapping 346 local storage media and remote management device virtual storage media into the selected guest.

The local storage media and the remote management device virtual storage media can be mapped 348 concurrently into multiple selected guests.

The illustrative systems and associated techniques enable a baseboard management controller remote graphics console to have direct access to virtual machine guests. Conventional virtualization platforms do not allow the baseboard management controller to directly access virtual machine guests remotely or allow baseboard management controller virtual media to be directly mapped into the guest operating system environment.

The illustrative systems and associated techniques enable remote control of virtual machines without installation of third-party management software.

Figure 3D:
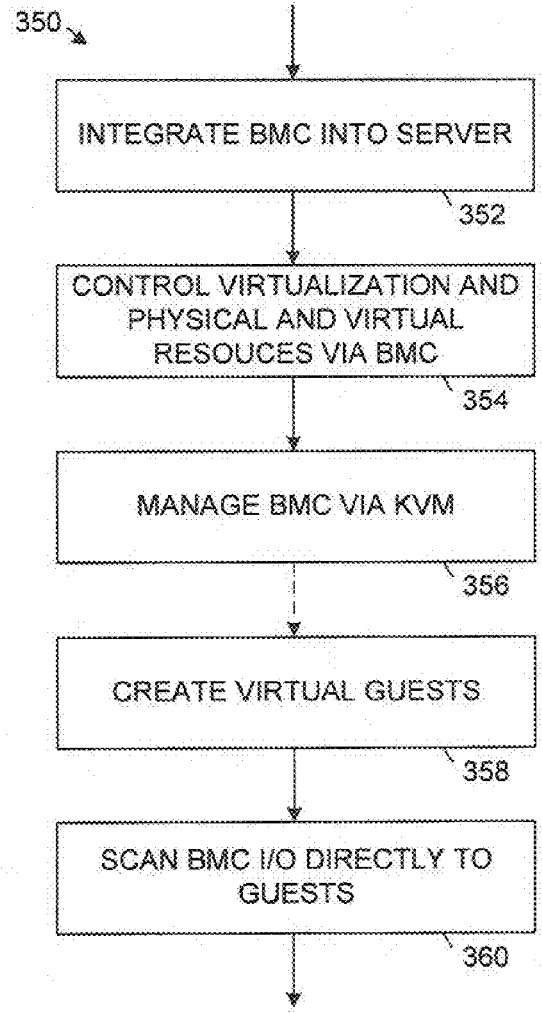

Referring to FIG. 3D, a flow chart depicts a computer-executed method for operating 350 a virtualizing network computing system that includes a baseboard management controller. The method 350 comprises integrating 352 a baseboard management controller (BMC) into a physical server and controlling 354 resource virtualization and physical and virtual resources via the baseboard management controller. Operations of the baseboard management controller can be managed 356 via the virtual keyboard/video/mouse (KVM) element.

In some implementations, virtual guests can be created 358, for example through usage of the baseboard management controller. Input/output ports and media of the baseboard management controller can be scanned 360 directly into the virtual guests.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

The block diagrams and flow charts further describe an article of manufacture comprising a controller-usable medium having a computer readable program code embodied in a controller for managing virtual machines (VMs) in a distributed network system.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A data processing system comprising:
a virtualization platform having at least one physical server configured to run a plurality of guest operating systems simultaneously in respective virtual machines;
a baseboard management controller having a processor; and
a virtual keyboard/video/mouse (KVM) element executable in the virtualization platform to:
select, in response to input, one of the guest operating systems;
control the baseboard management controller to export a guest console of the selected guest operating system to a computer to display the guest console as a remote management graphics console at the computer; and
map a physical storage medium of the computer as a virtual storage medium to the selected guest operating system.

2. The system according to claim 1,
wherein the virtual keyboard/video/mouse (KVM) element is communicatively-coupled for controlling the baseboard management controller to present the remote management graphics console in a browser of the computer.

3. The system according to claim 1 further comprising:
a logic to scan input/output ports and media of the baseboard management controller directly into the guest operating systems.

4. The system according to claim 1 further comprising:
a logic to map a physical server graphics frame buffer directly into a virtual frame buffer of the selected guest operating system; and
the virtualization platform configured to respond to the mapping of the physical graphics frame buffer by saving a current virtual machine (VM) state associated with the selected guest operating system, restoring a newly designated VM state including a graphics controller mode, and mapping the virtual frame buffer of the selected guest operating system to the physical server graphics frame buffer.

5. The system according to claim 1, wherein the at least one physical server includes:
a plurality of physical servers configured to run the guest operating systems.

6. The system according to claim 1, wherein the baseboard management controller is controllable by the virtual KVM element to perform the mapping by presenting the physical storage medium of the computer as the virtual storage medium in the virtualization platform.

7. The system according to claim 1, wherein the input to cause selection of one of the guest operating systems is a hot-key activation by a user.

8. The system according to claim 7, wherein different hot-key combinations correspond to selection of different ones of the guest operating systems.

9. The system according to claim 1, wherein the baseboard management controller is configured to export the guest console by monitoring activity of a physical frame buffer in the virtualization platform and to transmit the activity to the computer.

10. The system according to claim 1, wherein the virtual KVM element is to further map other physical resources of the computer as virtual resources to the selected guest operating system.

11. The system according to claim 1, wherein the virtual KVM element is responsive to user input at the computer to control an operation of at least one of the virtual machines.

12. The system according to claim 11, wherein the operation is selected from among a
   virtual machine shutdown, virtual machine suspend, and virtual machine startup.

13. A computer-executed method for operating a virtualizing network computing system, comprising:
   running a plurality of guest virtual machines simultaneously on at least one physical server;
   operating a virtual keyboard/video/mouse (KVM) element for virtual machine control;
   receive selection of one of the guest virtual machines;
   using a baseboard management controller under control of the KVM element to export a guest console of the selected guest virtual machine to a computer to display the guest console at the computer; and
   mapping, by the baseboard management controller, a physical storage medium of the computer as a virtual storage medium to the selected guest virtual machine.

14. The method according to claim 13 further comprising:
   enabling a user to remotely access the guest console via a browser.

15. The method according to claim 13 further comprising:
   mapping a physical server graphics frame buffer directly into a virtual frame buffer of the selected guest virtual machine; and
   responding to the mapping by:
      saving a current virtual machine state associated with the selected guest virtual machine;
      restoring a newly designated virtual machine state including a graphics controller mode; and
      mapping the virtual frame buffer of the selected virtual machine to the physical server graphics frame buffer.

16. The method according to claim 13, wherein the baseboard management controller is controllable by the virtual KVM element to perform the mapping by presenting the physical storage medium of the computer as the virtual storage medium in a virtualization platform in which the plurality of guest virtual machines execute.

17. The method according to claim 13, wherein the selection of one of the guest virtual machines is in response to a hot-key activation at the computer.

18. The method according to claim 17, wherein different hot-key combinations correspond to selection of different ones of the guest virtual machines.

19. The method according to claim 13, wherein the baseboard management controller exports the guest console by monitoring activity of a physical frame buffer and transmitting the activity to the computer.

20. The method according to claim 13, further comprising:
   mapping, by the baseboard management controller, other physical resources of the computer as virtual resources to the selected guest virtual machine.

21. The method according to claim 13, wherein the virtual KVM element is responsive to user input at the computer to control an operation of at least one of the guest virtual machines.

22. The method according to claim 21, wherein the operation is selected from among a virtual machine shutdown, a virtual machine suspend, and a virtual machine startup.

23. An article of manufacture comprising:
   a non-transitory computer-readable medium having a computer readable program code for operating a virtualization platform having at least one physical server, the computer readable program code comprising:
      code causing the virtualization platform to run a plurality of guest operating systems simultaneously in respective virtual machines on the at least one physical server;
      code causing the virtualization platform to operate a virtual keyboard/video/mouse (KVM) element for virtual machine control;
      code causing the virtualization platform to receive input selecting one of the guest operating systems and to use a baseboard controller to export a guest console of the selected guest operating system to a computer to display the guest console at the computer; and
      code causing the virtual KVM element to map a physical storage medium of the computer as a virtual storage medium to the selected guest virtual machine.

* * * * *